H. Allen,
Packing for Boiler Tubes.
No. 2,237. Reissued May 8, 1866.
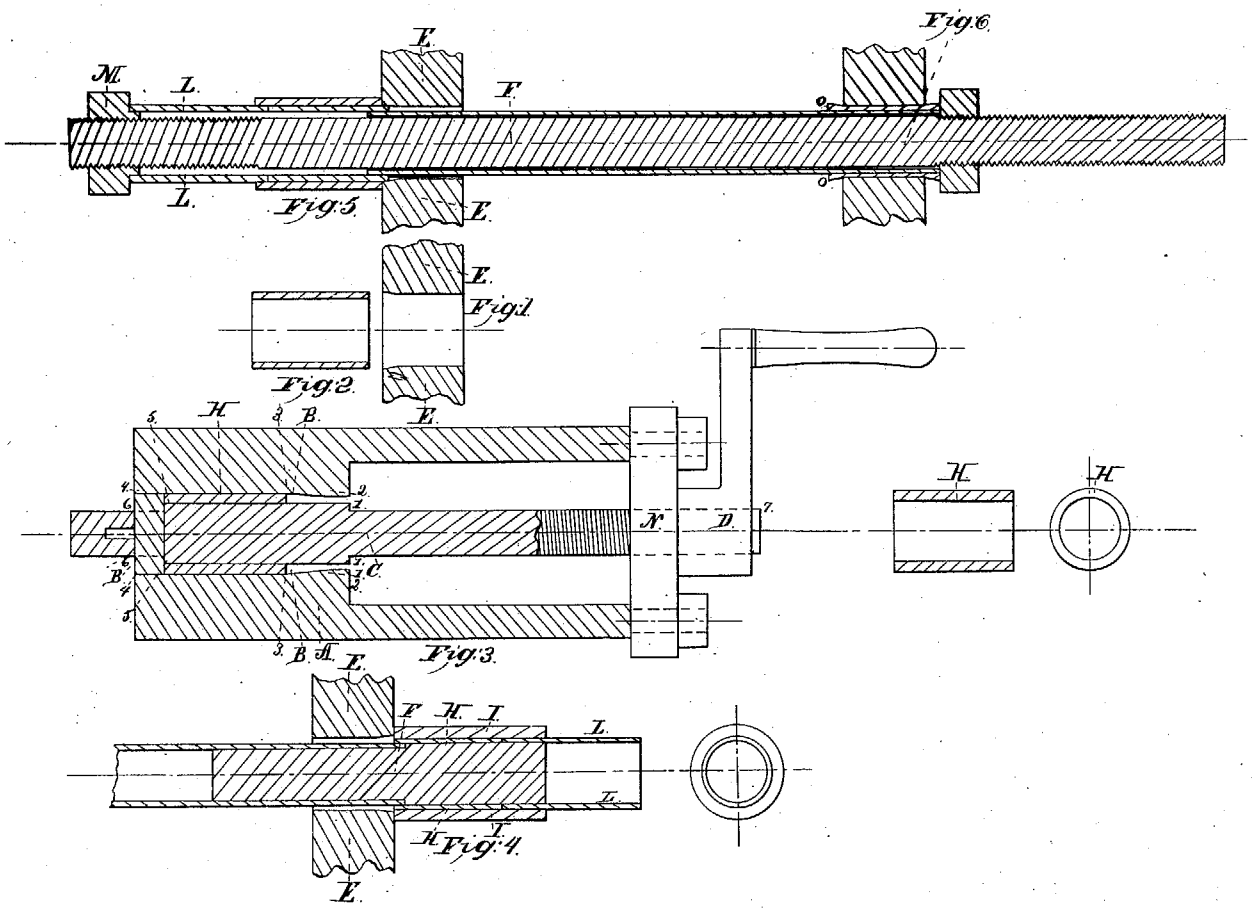
Witnesses:
Chas. A. Taylor.
Fred. W. Child.
Inventor:
Horatio Allen.
N. PETERS, PHOTO-LITHOGRAPHER, WASHINGTON, D. C.

UNITED STATES PATENT OFFICE.

HORATIO ALLEN, OF NEW YORK, N. Y.

IMPROVEMENT IN PACKING FOR TUBES OF CONDENSERS.

Specification forming part of Letters Patent No. 20,927, dated July 20, 1858; Reissue No. 2,237, dated May 8, 1866.

*To all whom it may concern:*

Be it known that I, HORATIO ALLEN, of New York city, New York, have invented an Improvement in the Mode of Making the Joints of Tubes of Condensers and Similar Instruments, of which the following is a specification.

Various modes have been devised for making the connection of the tubes with the head which it passes through in such manner that perfect tightness against leakage or passage of air or fluid may be secured, and at the same time a freedom for the expansion and contraction of the tube is provided, which does not impair the tightness of the joint. The plan which I have invented effects these essential ends with great certainty, simplicity, and economy, and with the use of materials of great durability, and also provides for the easy renewal of each tube and of the renewal of the joint.

It is well known that white pine (and other woods of same character) when thoroughly dried lose about one-twentieth of their original thickness, and that when placed in water the pine will return to its original thickness. It is also a fact that well-seasoned white pine and other woods of same character can be compressed into less than half their thickness and retain their tenacity, and will then be of increased density and will bear to be driven into a joint with considerable force. When a piece of dry white pine, (which is named as the best wood,) either uncompressed or compressed, is driven into a joint and the joint is immersed in water, the dry piece and the compressed piece will tend to return to their original thickness before being dried. When simply seasoned wood is used, the joint will be tight up to a pressure of about fifteen pounds to the square inch, but at a pressure exceeding that number of pounds to the inch water will be forced to some extent through the pores of the wood; but when compressed dry wood is used it will require a higher degree of pressure to force water through the wood, according as the piece has been compressed to a greater degree before it was inserted.

The joint which I have invented for making the joints of tubes rests on these facts. The hole in the tube is drilled from one-fifth to one-fourth of an inch larger diameter than that of the tube which is to enter it. For about three-sixteenths of an inch of the depth of the hole it is reamed out bell-mouthed to a slight degree. A tube of dry white pine of suitable thickness, and about three-eighths of an inch longer than thickness of the tube-sheet, is used to make the joint by being driven into it, the thickness of the wooden tube being as much greater than that of the joint as will allow it to be driven or forced into the joint. For light pressure—say not over twenty pounds to the square inch—the wooden tube need not be compressed, but for greater pressure and to make a more perfect joint it is preferable to use tubes of compressed wood carrying the compression to the highest degree consistent with preserving the tenacity of the wood.

To effect the compression of the wooden tube, an instrument is used, represented in Fig. 3. Through the brass A is the circular hole B. This hole from 1 to 2 is of the same diameter as that of the outside of the wooden tube when compressed, from 3 to 4 it is of the diameter of the wooden tube before compression, and that part of the hole between 2 and 3 is conical, connecting the two holes, the surfaces being made very smooth. Through the hole B passes the rod C. The diameter of the rod C from 1 to 5 is that of the inside diameter of the wooden tube, which (as has been said) is that of the outside diameter of metal tube. From 5 to 6 is a collar, *c*, which is held on the rod by the key, which collar is of the diameter of the wooden tube before compression. The rod from 1 to 7 is of less diameter than from 1 to 5, and passes through the piece N, and is cut to receive the nut D. By the removal of the collar C the wooden tube to be compressed is inserted on the rod B, and by keying the collar on the instrument is prepared to effect the compression of the piece. This is done by turning the nut D, by which means the wooden tube is forced through the cone and made to take dimensions of the joint from 1 to 2, and will come out compressed to about one-half the original thickness. In most cases it will not be necessary to compress the wood any more than can be effected to bring it into the joint. To enable that to be done, and with a good degree of power, means are provided and used, as represented in Fig. 5. The hole in the tube-plate being made of requisite diameter to make the joint of the proper size, (which will usually be about one-tenth of an inch,) and being reamed out bell-mouthed for about one-fifth of an inch, and the dry wooden tube, either compressed or uncompressed, being ready for insertion, a rod, F, is run through the tube. On the part extending beyond the tube a screw is cut. The dry wooden tube H is placed over the rod and entered in the bell-mouth entrance. The outer guide-piece, I, is placed over the wooden tube, and the forcing-piece L is placed on the rod and against the end of the wooden tube. The nut M is screwed on the rod F, and by continuing to turn the nut its action through the forcing-piece I will force the wooden tube into the joint. While this insertion of the wooden tube is being made, the metal tube must be held at the further end. The wooden tube can also be inserted by being driven in by a mallet.

Instead of making the wooden tube of one cylindrical piece, the joint could be made and same end effected, but with more risk of imperfect joints, by making the tube of pieces of compressed or uncompressed wood.

Figure 1 represents section of tube-plate and metal tube, showing the space provided for the insertion of the wooden tube and the bell-mouth entrance. Fig. 2 represents the wooden tube, either compressed or uncompressed, ready for insertion into the joint. Fig. 6 represents the wooden tube after it has been inserted and saturated with water. Fig. 4 represents means used when the wooden tube is forced in by blows.

I am aware that in lines of pipes for conveying water short pipes of wood banded with iron at the ends have been used to connect the iron pipes, the iron pipe being driven into the wooden pipe or the wooden pipe into the iron pipe; but this combination is not one for making an imperfect joint tight, but is a construction of wooden and iron pipes, the joints of which shall not, from the material used, be imperfect, and I do not claim such combination of wood and iron pipes as embraced within my device.

The invention herein described for making the joints in the heads of surface-condensers is plainly applicable without further invention to closing water-tight the annular space formed when a tube or cylindrical body passes through a cylindrical hole, whatever be the material. Thus it may be applied to closing at any desired point the annular space intervening between the outside of the tube in an oil-well and the inside of the hole drilled through rock, and thereby, in its expanded state, when saturated by water, prevent the passage of water through said annular space. Tubes of compressed wood or uncompressed wood, in one piece or in separate staves, as herein described, and of a few inches in length, would effectually answer the purpose.

What I claim, and desire to secure by Letters Patent, is—

1. Making the joint formed by two metal surfaces (as in the joints of the tubes in the tube-sheets of surface-condensers and other similar instruments) tight by inserting between the tube and tube-sheet a tube of seasoned or compressed wood, made either in one or several pieces, relying on the expansion of the wood after being saturated by water to make the joint tight, and on the freedom of the metal tube to move endwise without impairing the tightness of the joint, to avoid injurious results from the expansion and contraction of the metal tube, all substantially in the manner and for the purpose herein set forth.

2. Closing at any desired point the annular space formed where a tube passes through a long cylindrical hole by surrounding the metal tube at that point by a tube of seasoned or compressed wood (in one or several pieces or staves) of such thickness that when saturated with water it will fill water-tight the annular space at that point, substantially in the manner herein described.

HORATIO ALLEN.

Witnesses:
CHAS. A. TAYLOR,
HENRY D. JUSTISON.